United States Patent
Dunko

(10) Patent No.: US 9,368,997 B2
(45) Date of Patent: Jun. 14, 2016

(54) SYSTEMS INVOLVING MAGNETIC ATTACHMENT FOR PORTABLE ELECTRONIC DEVICES AND RELATED METHODS

(75) Inventor: Gregory A. Dunko, Cary, NC (US)

(73) Assignee: HTC CORPORATION, Taoyuan (TW)

( * ) Notice: Subject to any disclaimer, the term of this patent is extended or adjusted under 35 U.S.C. 154(b) by 416 days.

(21) Appl. No.: 13/564,918

(22) Filed: Aug. 2, 2012

(65) Prior Publication Data

US 2014/0035517 A1 Feb. 6, 2014

(51) Int. Cl.
| | | |
|---|---|---|
| *H02J 7/00* | (2006.01) | |
| *H02J 7/02* | (2016.01) | |
| *H02J 5/00* | (2016.01) | |
| *H01F 7/02* | (2006.01) | |
| *H01F 38/14* | (2006.01) | |

(52) U.S. Cl.
CPC .............. *H02J 7/025* (2013.01); *H01F 7/0226* (2013.01); *H02J 5/005* (2013.01); *H01F 38/14* (2013.01)

(58) Field of Classification Search
CPC ....................................................... H02J 7/025
USPC .......................................... 320/108, 113–115
See application file for complete search history.

(56) References Cited

U.S. PATENT DOCUMENTS

| | | | | |
|---|---|---|---|---|
| 6,398,335 | B1 * | 6/2002 | Benjamin | B41J 25/34 347/19 |
| 2008/0039688 | A1 * | 2/2008 | Minal | A61B 1/04 600/117 |
| 2009/0079387 | A1 * | 3/2009 | Jin et al. | 320/108 |
| 2009/0096413 | A1 * | 4/2009 | Partovi et al. | 320/108 |
| 2010/0081473 | A1 * | 4/2010 | Chatterjee | G06F 1/1632 455/559 |
| 2010/0264872 | A1 * | 10/2010 | Kwong | 320/108 |
| 2010/0308187 | A1 * | 12/2010 | Lin | 248/206.5 |

* cited by examiner

*Primary Examiner* — Drew A Dunn
*Assistant Examiner* — Zixuan Zhou
(74) *Attorney, Agent, or Firm* — McClure, Qualey & Rodack, LLP

(57) ABSTRACT

Systems involving magnetic attachment for portable electronic devices and related methods are provided. In this regard, a representative system includes: a magnetic attachment system operative to generate a magnetic field, the magnetic attachment system being operative to vary a strength of the magnetic field based, at least in part, on a control input such that a portable electronic device is magnetically attached to the electronic apparatus.

15 Claims, 3 Drawing Sheets

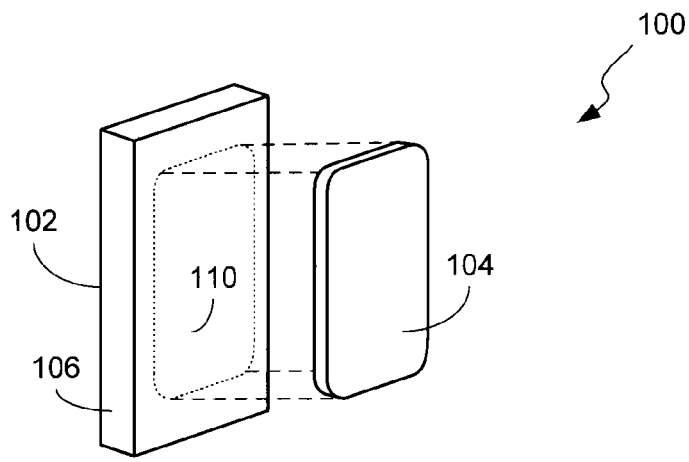

FIG. 1

```
┌─────────────────────────────────────────────┐
│ GENERATING A MAGNETIC FIELD(S) WITH AT      │
│ LEAST ONE OF AN ELECTRONIC APPARATUS AND    │
│   A PORTABLE ELECTRONIC DEVICE      120     │
└─────────────────────────────────────────────┘
                      │
                      ▼
┌─────────────────────────────────────────────┐
│ VARYING A STRENGTH OF THE MAGNETIC FIELD    │
│ BASED, AT LEAST IN PART, ON A CONTROL INPUT │
│ SUCH THAT THE STRENGTH IS SUFFICIENT TO     │
│ MAGNETICALLY ATTACH A PORTABLE              │
│ ELECTRONIC DEVICE TO THE ELECTRONIC         │
│                 APPARATUS                   │
│                                      122    │
└─────────────────────────────────────────────┘
```

FIG. 2

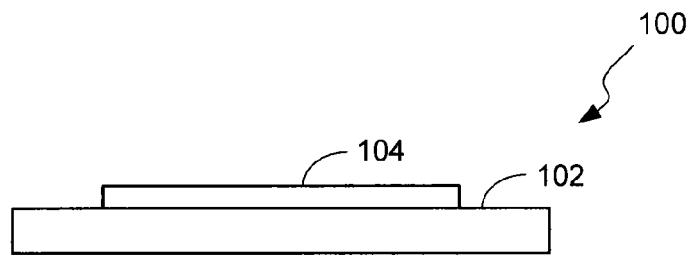

FIG. 3

SYSTEMS INVOLVING MAGNETIC ATTACHMENT FOR PORTABLE ELECTRONIC DEVICES AND RELATED METHODS

TECHNICAL FIELD

The present disclosure generally relates to portable electronic devices.

BACKGROUND

Portable electronic devices (e.g., mobile phones) exhibit differences in various features such as size, shape and weight. Although the variety of such features provides consumers with numerous choices, such variety also tends to make it difficult to produce electronic apparatuses (e.g., accessories) that are suitable across a broad range of products and use cases.

SUMMARY

Systems involving magnetic attachment for portable electronic devices and related methods are provided. Briefly described, one embodiment, among others, is an electronic apparatus for use with a portable electronic device comprising: a magnetic attachment system operative to generate a magnetic field, the magnetic attachment system being operative to vary a strength of the magnetic field based, at least in part, on a control input such that the portable electronic device is secured to the electronic apparatus via the magnetic field.

Another embodiment is a system involving magnetic attachment between a portable electronic device and an electronic apparatus, the system comprising: a magnetic attachment system operative to generate a magnetic field, the magnetic attachment system being operative to vary a strength of the magnetic field based, at least in part, on a control input such that a portable electronic device is magnetically attached to the electronic apparatus.

Another embodiment is a method for securing a portable electronic device to an electronic apparatus comprising: generating a magnetic field with at least one of the electronic apparatus and the portable electronic device; and varying a strength of the magnetic field based, at least in part, on a control input such that the strength of the magnetic field is sufficient to magnetically attach the portable electronic device to the electronic apparatus.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a schematic diagram of an example embodiment of a system involving magnetic attachment.

FIG. 2 is a flowchart depicting an example embodiment of a method for securing a portable electronic device involving magnetic attachment.

FIG. 3 is a schematic diagram of an example embodiment of a system involving magnetic attachment.

DETAILED DESCRIPTION

Figure 4:
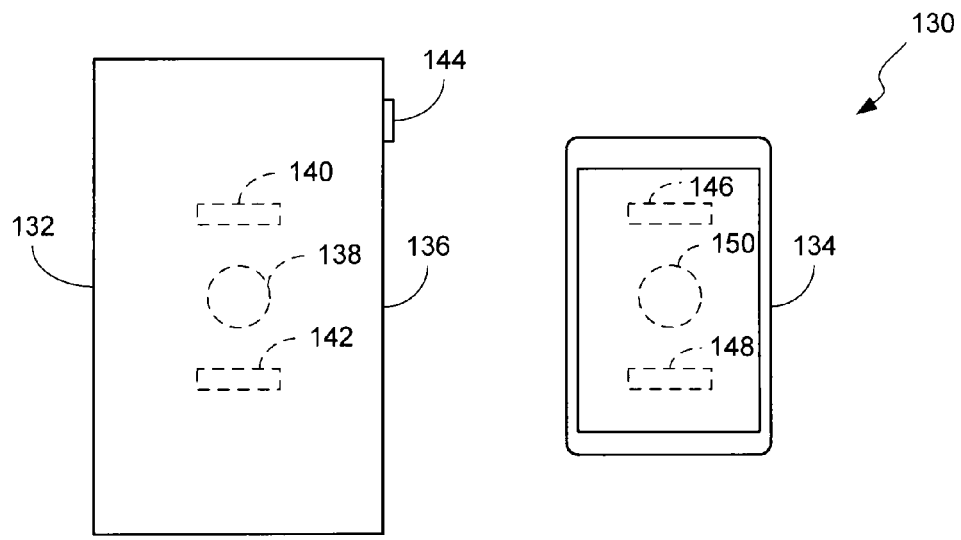
FIG. 4 is a schematic diagram of another example embodiment of a system involving magnetic attachment.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, systems involving magnetic attachment for portable electronic devices and related methods are provided. In some embodiments, an electronic apparatus for a portable electronic device is configured with a battery charger function for charging the portable electronic device, such as via inductive charging. In order to ensure securement of the device to the electronic apparatus, a magnetic field is generated by the electronic apparatus, with the magnetic field being of variable (i.e., selectable) strength. In some embodiments, the strength of the magnetic field may be user defined.

Additionally, or alternatively, the strength of the magnetic field may be associated with an orientation of the electronic apparatus. By way of example, if the electronic apparatus is oriented so that a magnetically attached device will be maintained in a substantially vertical orientation, the strength of the magnetic field may be stronger than would otherwise be exhibited if the electronic apparatus were oriented to maintain the device in a more horizontal orientation. Notably, in a more horizontal orientation, gravity typically assists in maintaining the device in position against the electronic apparatus.

In other embodiments, the variable magnetic field may be associated with a portable electronic device, while in others, variable magnetic fields may be associated with both a portable electronic device and an electronic apparatus.

FIG. 1 is a schematic diagram of an example embodiment of a system involving magnetic attachment. As shown in FIG. 1, system 100 includes an electronic apparatus 102 and a portable electronic device 104, which, in this case, is a smartphone. The electronic apparatus incorporates a housing 106 and is configured to generate a magnetic field of sufficient strength to magnetically attach device 104 to the housing. Notably, device 104 is typically magnetically attached to the electronic apparatus by a user of the device placing the device in close enough proximity to the housing for the electronic apparatus and device to magnetically engage. Removal of the device is facilitated by the user overpowering the magnetic forces by pulling the device from the electronic apparatus.

In the embodiment of FIG. 1, attachment of device 104 to electronic apparatus 102 is performed to facilitate recharging of the device. Notably, electronic apparatus 102 incorporates a wireless (i.e., inductive) charging function. A charging area 110 located at the housing of the electronic apparatus is provided as the portion of the electronic apparatus against which the portable electronic device is to be positioned during charging.

In operation, electronic apparatus 102 (optionally) receives user inputs in order to define a magnetic field strength that is to be exhibited by the electronic apparatus. As such, the user may select a strength that the user feels is suited for providing adequate magnetic attachment for a portable electronic device, such as device 104.

FIG. 2 is a flowchart depicting an example embodiment of a method for securing a portable electronic device to an electronic apparatus such as may be performed by system 100 of FIG. 1, for example. As shown in FIG. 2, the method involves generating a magnetic field with at least one of the electronic apparatus and the portable electronic device (block 120). Then, as depicted in block 122, the strength of the magnetic field is varied based, at least in part, on a control input. The strength of the magnetic field, although sufficient to magnetically attach the portable electronic device to the electronic apparatus, may be selected by the user in some embodiments. Specifically, the control input may correspond to a user-defined setting of the strength of the magnetic field. This may be particularly useful since the attractive forces between the electronic apparatus and various devices may be different even with the same field strength. As such, a user may desire a less forceful magnetic engagement between their device and the electronic apparatus in some cases, whereas in other cases a more forceful magnetic engagement may be desired.

As another example, the control input may be associated with a sensor that is able to determine the orientation of the electronic apparatus. In this regard, FIG. 3 depicts electronic apparatus 102 in a substantially horizontal orientation in contrast to the substantially vertical orientation of FIG. 1. Responsive to the sensor determining that the electronic apparatus is in the horizontal orientation, a control input may be provided for altering the strength of the magnetic field. As mentioned above, this may involve reducing the strength of the magnetic field. Alternatively, this may involve altering the strength of the magnetic field to correspond to a user-defined strength.

FIG. 4 is a schematic diagram of another example embodiment of a system involving magnetic attachment. As shown in FIG. 4, system 130 includes an electronic apparatus 132 and a portable electronic device 134. The electronic apparatus incorporates a housing 136 that forms the outer surfaces of the electronic apparatus and defines an interior in which various components are located. In this embodiment, the components mounted within the housing include an inductive charging system (a coil 138 of which is depicted) and variable strength magnets (140, 142). A user interface 144 (e.g., an actuator) also is provided that is configured to enable a user of the electronic apparatus to define the strength of the magnetic field.

Magnets 140 and 142 are spaced from each other with coil 138 being positioned therebetween. So configured, the magnets may be used not only to facilitate engagement with device 134, but to align the device with the electronic apparatus to facilitate proper charging. Notably, device 134 includes magnets 146, 148 (e.g., permanent magnets of fixed strength), with a recharging coil 150 of a battery recharging system being position therebetween. As such, engagement of each of the magnets of the electronic apparatus with a corresponding magnet of the device positions the device so that the recharging coil 150 is adjacent the charging coil 138.

In this embodiment, a user of the electronic apparatus is enabled to define the magnetic field strength associated with each of the orientation settings of the electronic apparatus. For instance, when the electronic apparatus is in a first orientation, the user may be enabled to input a corresponding setting for the magnetic strength that is to be exhibited in the first orientation. Similarly, when the electronic apparatus is in a second orientation, the user may be enabled to input a corresponding setting for the magnetic strength that is to be exhibited in the second orientation, and so forth. These settings may be saved, such as in a look-up table, for example, that may be accessed when the orientation of the electronic apparatus changes.

In an alternative embodiment, magnets of the electronic apparatus (e.g., magnets 140, 142) may be permanent magnets and magnets of the portable electronic device (e.g., magnets 146, 148) may be variable strength magnets.

Figure 5:
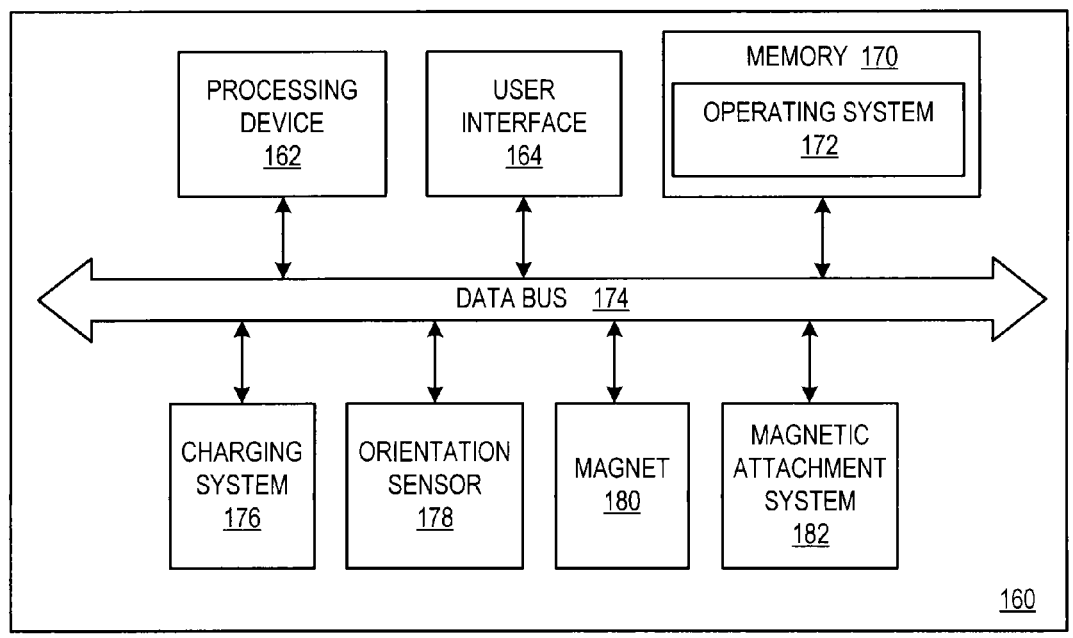
FIG. 5 is a schematic diagram of another example embodiment of a system involving magnetic attachment.

FIG. 5 is a schematic diagram of portion of an example embodiment of a system involving magnetic attachment and, in particular an electronic apparatus. As shown in FIG. 5, electronic apparatus 160 includes a processing device (processor) 162, user interface 164, a memory 170 and an operating system 172, with each communicating across a local data bus 174. Additionally, the electronic apparatus incorporates a charging system 176, an orientation sensor 178, one or more variable strength magnets 180 and a magnetic attachment system 182.

The processing device 162 may include a custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 170 may include any one of a combination of volatile memory elements (e.g., random-access memory (RAM, such as DRAM, and SRAM, etc.)) and nonvolatile memory elements. The memory typically comprises native operating system 172, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

User interface 164 is configured to allow users to input various information such as may be required to define the strength of the magnetic field.

Charging system 176 is configured to enable charging of a battery of a portable electronic device, such as via inductive charging.

Orientation sensor 178 is configured to determine a current orientation of the electronic apparatus. By way of example, the sensor may be implemented by one or more accelerometers or one of various other types of components. In some embodiments, the sensor is able to discriminate between substantially vertical and substantially horizontal orientations of the electronic apparatus.

Variable strength magnet(s) 180 are configured to exhibit a magnetic field, the strength of which is selectively alterable via the magnetic attachment system 182. In this regard, the magnetic attachment system is operative to vary a strength of the magnetic field based, at least in part, on a control input so that the portable electronic device is magnetically attached to the electronic apparatus. In this embodiment, the orientation sensor provides a control input corresponding to the detected orientation of the electronic apparatus and, responsive to the control input corresponding to a first orientation of the electronic apparatus (e.g., a vertical orientation), the magnetic field is set to a first strength (e.g., a high strength). In contrast, responsive to the control input corresponding to a second orientation of the electronic apparatus (e.g., a horizontal orientation), the magnetic field is set to a second strength (e.g., a lower strength).

Figure 6:
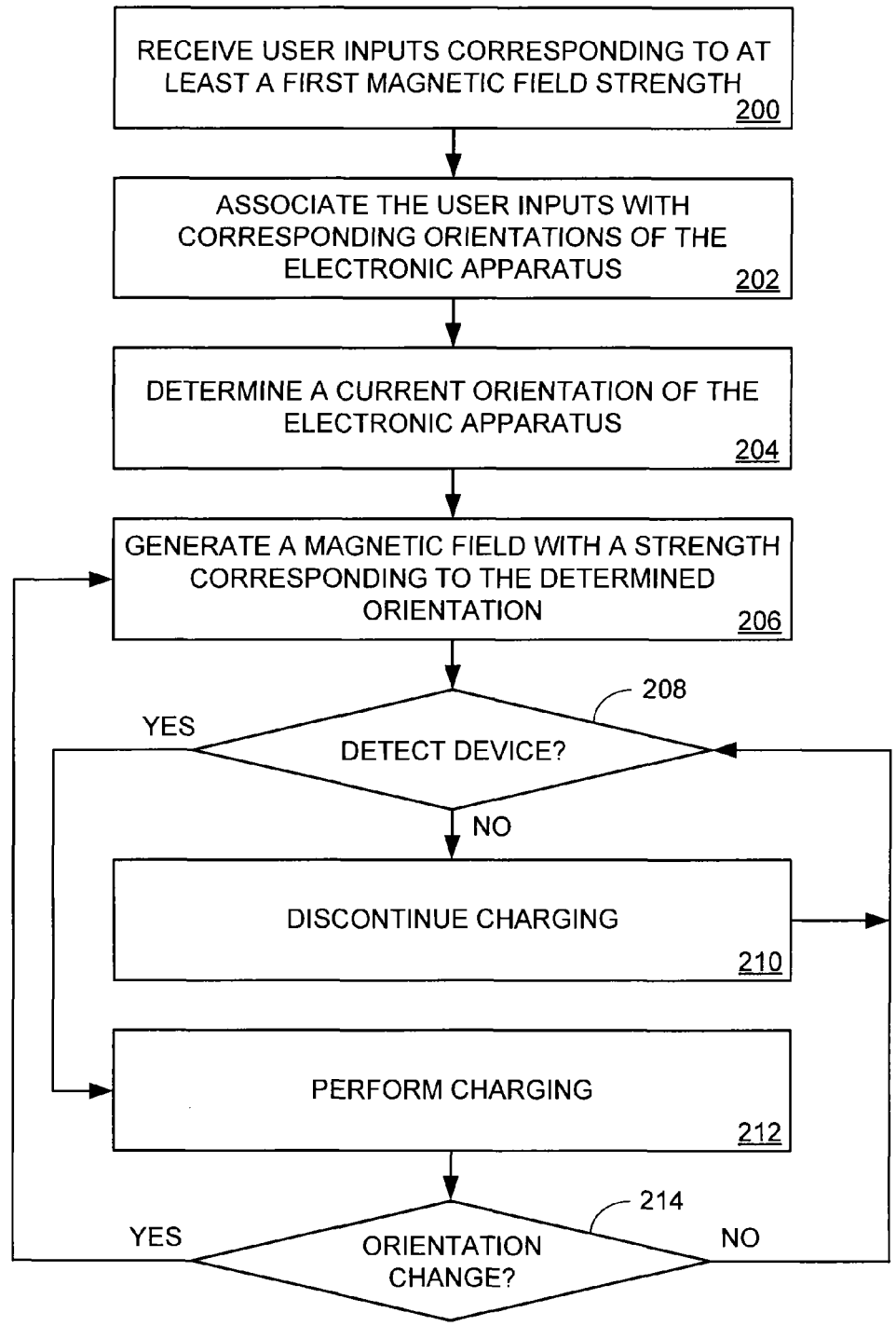
FIG. 6 is a flowchart depicting functionality that may be performed by an example embodiment of a system involving magnetic attachment.

FIG. 6 is a flowchart depicting functionality that may be performed by an example embodiment of a system involving magnetic attachment. As shown in FIG. 6, the functionality (or method) may be construed as beginning at block 200, in which user inputs corresponding to at least a first magnetic field strength are received. In block 202, the user inputs are associated with corresponding orientations of the electronic apparatus. In block 204, a current orientation of the electronic apparatus is determined after which, in block 206, a magnetic field is generated with strength corresponding to the determined orientation.

In block 208, a determination is made as to whether a device is detected (e.g., magnetically attached to the electronic apparatus). If it is determined that a device is detected, the process may proceed to block 212, in which charging is performed. In block 214, another determination is performed. Specifically, a determination is made as to whether the orientation of the electronic apparatus has changed. If it is determined that the orientation of the electronic apparatus has changed the process may return to block 206, in which the field strength is altered to correspond to the orientation. However, if the orientation has not changed, the process may return to block 208 to determine whether or not the device is still detected.

If a device is not detected in block 208, the process may proceed to block 210, in which charging is discontinued.

If embodied in software, it should be noted that each block depicted in the flowchart of FIG. 6 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and variations are intended to be included herein within the scope of this disclosure and protected by the following claims.

The invention claimed is:

1. An electronic apparatus for use with a portable electronic device, the electronic apparatus comprising:
  a housing;
  an orientation sensor operative to detect orientation of the electronic apparatus and to provide a control input corresponding to the orientation detected;
  a magnetic attachment system having at least two variable strength magnets operative to generate a magnetic field, the magnetic attachment system being operative to vary a strength of the magnetic field based, at least in part, on the control input such that the portable electronic device is magnetically attached to the electronic apparatus;
  a wireless charging system having a wireless charging coil, the wireless charging system being operative to charge the portable electronic device via inductive charging, the wireless charging coil being disposed between the at least two variable strength magnets; and
  a processing unit, coupled to the orientation sensor and the magnetic attachment system;
  wherein responsive to the processing unit determining that the orientation of the electronic apparatus is in a first orientation according to the control input the magnetic field is set to a first strength by the processing unit, and responsive to the processing unit determining that the orientation of the electronic apparatus is in a second orientation according to the control input the magnetic field is set to a second strength by the processing unit;
  wherein the first orientation corresponds to a non-horizontal orientation, the second orientation corresponds to a horizontal orientation, and the first strength is stronger than the second strength such that, regardless of whether the portable electronic device is in the first orientation or the second orientation, strength of the magnetic field is varied to maintain magnetic attachment of the portable electronic device to the electronic apparatus.

2. The electronic apparatus of claim 1, wherein:
  the housing has a charging area on an exterior surface thereof; and
  the magnetic attachment system is operative to secure the portable electronic device to the charging area.

3. The electronic apparatus of claim 2, wherein:
  the wireless charging system has a coil operative to perform the inductive charging; and
  the magnetic attachment system has a variable strength magnet.

4. The electronic apparatus of claim 3, wherein the coil and the variable strength magnet are positioned beneath the charging area and spaced laterally from each other.

5. The electronic apparatus of claim 3, wherein:
  the variable strength magnet is a first variable strength magnet;
  the magnetic attachment system has a second variable strength magnet; and
  the coil is positioned between the first variable strength magnet and the second variable strength magnet.

6. The electronic apparatus of claim 1, wherein the first orientation corresponds to a vertical orientation.

7. The electronic apparatus of claim 1, wherein the first strength is user selectable.

8. The electronic apparatus of claim 7, wherein the second strength is user selectable.

9. A system involving magnetic attachment between a portable electronic device and an electronic apparatus, the system comprising:

an orientation sensor operative to detect orientation of the electronic apparatus and to provide a control input corresponding to the orientation detected;

a magnetic attachment system having at least two variable strength magnets operative to generate a magnetic field, the magnetic attachment system being operative to vary a strength of the magnetic field based, at least in part, on the control input such that a portable electronic device is magnetically attached to the electronic apparatus; and a processing unit, coupled to the orientation sensor and the magnetic attachment system;

wherein responsive to the processing unit determining that the orientation of the electronic apparatus is in a first orientation according to the control input the magnetic field is set to a first strength by the processing unit, and responsive to the processing unit determining that the orientation of the electronic apparatus is in a second orientation according to the control input the magnetic field is set to a second strength by the processing unit such that, regardless of whether the portable electronic device is in a non-horizontal orientation or a horizontal orientation, strength of the magnetic field is varied to maintain magnetic attachment of the portable electronic device to the electronic apparatus.

10. The system of claim 9, wherein:

the system further comprises the portable electronic device to which the magnetic attachment system is mounted;

the electronic apparatus has a wireless charging system and a permanent magnet, the permanent magnet being positioned to align the portable electronic device responsive to the magnetic field, the wireless charging system having a wireless charging coil, the wireless charging system being operative to charge the portable electronic device via inductive charging.

11. The system of claim 9, wherein:

the system further comprises the electronic apparatus to which the magnetic attachment system is mounted;

the portable electronic device has a permanent magnet positioned to align the portable electronic device responsive to the magnetic field.

12. A method for securing a portable electronic device to an electronic apparatus comprising:

detecting, by the electronic apparatus, a first orientation of the electronic apparatus, the first orientation corresponding to a horizontal orientation;

setting a magnetic field generated by the electronic apparatus to a first strength based, at least in part, on a control input corresponding to the first orientation such that the first strength of the magnetic field is sufficient to magnetically attach the portable electronic device to the electronic apparatus in the first orientation;

charging the portable electronic device, while magnetically attached to the electronic apparatus in the first orientation, via inductive charge provided by the electronic apparatus;

detecting, by the electronic apparatus, a second orientation of the electronic apparatus, the second orientation corresponding to a non-horizontal orientation;

setting the magnetic field generated by the electronic apparatus to a second strength based, at least in part, on a control input corresponding to the second orientation, the second strength being stronger than the first strength such that the second strength of the magnetic field is sufficient to magnetically attach the portable electronic device to the electronic apparatus in the second orientation regardless of whether the portable electronic device is in a non-horizontal orientation or a horizontal orientation; and charging the portable electronic device, while magnetically attached to the electronic apparatus in the second orientation, via inductive charge provided by the electronic apparatus.

13. The method of claim 12, further comprising enabling a user to adjust the first strength of the magnetic field.

14. The electronic apparatus of claim 1, wherein:

the housing has a charging area on an exterior surface thereof, the charging area being sized and shaped to receive the electronic device thereon for inductive charging; and the first orientation corresponds to a non-horizontal orientation of the charging area.

15. The electronic apparatus of claim 1, wherein:

the housing has a charging area on an exterior surface thereof, the charging area being sized and shaped to receive the electronic device thereon for inductive charging;

the first orientation corresponds to a vertical orientation of the charging area; and the first strength of the magnetic field is stronger than the second strength.

* * * * *